United States Patent
Vitale

(10) Patent No.: US 8,419,312 B2
(45) Date of Patent: Apr. 16, 2013

(54) METHOD AND COMPOSITION FOR MODIFYING SOIL AND DUST CONTROL

(75) Inventor: Robert W. Vitale, Canton, OH (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

(21) Appl. No.: 13/538,076

(22) Filed: Jun. 29, 2012

(65) Prior Publication Data

US 2012/0275862 A1 Nov. 1, 2012

Related U.S. Application Data

(63) Continuation of application No. 13/231,492, filed on Sep. 13, 2011, now Pat. No. 8,210,769.

(51) Int. Cl.
 *E01C 3/06* (2006.01)
(52) U.S. Cl.
 USPC .................................. 404/72; 404/75; 404/76
(58) Field of Classification Search .................... 404/72, 404/75, 76
 See application file for complete search history.

(56) References Cited

U.S. PATENT DOCUMENTS

| | | | |
|---|---|---|---|
| 3,640,696 A | 2/1972 | Goldmann | |
| 3,651,649 A | 3/1972 | Najvar et al. | |
| 3,690,107 A | 9/1972 | Dolfing et al. | |
| 3,705,467 A | 12/1972 | McKnight | |
| 3,887,506 A | 6/1975 | Hewitt | |
| 3,895,956 A * | 7/1975 | Yoshida et al. | 106/204.3 |
| 4,106,296 A | 8/1978 | Leonard, Jr. et al. | |
| 4,129,435 A | 12/1978 | Takematsu et al. | |
| 4,218,234 A | 8/1980 | Nadasy et al. | |
| 4,252,556 A | 2/1981 | Nadasy et al. | |
| 4,268,428 A | 5/1981 | Green | |
| 4,417,992 A | 11/1983 | Bhattacharyya et al. | |
| 4,592,931 A | 6/1986 | Cargle | |
| 4,650,820 A | 3/1987 | Decroix | |
| 4,822,425 A | 4/1989 | Burch | |
| 5,013,349 A | 5/1991 | Tanaka | |
| 5,082,500 A | 1/1992 | Nachtman et al. | |
| 5,112,902 A | 5/1992 | Moriya et al. | |
| 5,178,668 A | 1/1993 | Traver et al. | |
| 5,595,782 A | 1/1997 | Cole | |
| 5,648,116 A | 7/1997 | Roe et al. | |
| 5,712,316 A | 1/1998 | Dahmen et al. | |
| 5,733,576 A | 3/1998 | Chmelir | |

(Continued)

FOREIGN PATENT DOCUMENTS

| | | |
|---|---|---|
| EP | 0 467 073 | 1/1992 |
| EP | 1 112 324 | 10/2005 |

(Continued)

OTHER PUBLICATIONS

ROHMAX Additives GmbH, "Viscoplex 1-180," Data Sheet, Jul. 2004, www.rohmax.com.

(Continued)

*Primary Examiner* — Raymond W Addie
(74) *Attorney, Agent, or Firm* — Daniel A. Thomson; Emerson Thomson Bennett, LLC

(57) ABSTRACT

A composition for chemical improvement of soil and road base materials including an aqueous solution of a water repellant and an aqueous emulsion of a soil stabilizer and dust retardant is herein disclosed.

20 Claims, 7 Drawing Sheets

U.S. PATENT DOCUMENTS

| | | |
|---|---|---|
| 5,824,725 A | 10/1998 | Lahalih |
| 5,846,601 A | 12/1998 | Ritter et al. |
| 5,860,770 A | 1/1999 | Hunt |
| 5,997,599 A | 12/1999 | Wommack et al. |
| 6,060,557 A | 5/2000 | Dahmen et al. |
| 6,076,997 A | 6/2000 | First et al. |
| 6,132,638 A | 10/2000 | Oldenhove |
| 6,325,836 B1 | 12/2001 | Wommack et al. |
| 6,349,499 B1 | 2/2002 | Spittle |
| 6,403,700 B1 | 6/2002 | Dahmen et al. |
| 6,503,521 B1 | 1/2003 | Atis |
| 6,695,545 B2 | 2/2004 | Boston |
| 6,729,805 B2 | 5/2004 | Wathen |
| 6,750,262 B1 | 6/2004 | Hahnle et al. |
| 6,759,453 B2 | 7/2004 | Jelling et al. |
| 6,982,291 B2 | 1/2006 | Desin |
| 7,001,444 B2 | 2/2006 | Small |
| 7,026,390 B2 | 4/2006 | O'Brien-Bernini et al. |
| 7,070,709 B2 | 7/2006 | Schilling et al. |
| 7,074,266 B2 | 7/2006 | Hawkins et al. |
| 7,134,806 B2 | 11/2006 | Lazic |
| 7,207,744 B2 | 4/2007 | Jones, IV et al. |
| 7,285,515 B2 | 10/2007 | Goncalves et al. |
| 7,514,018 B2 | 4/2009 | Schilling et al. |
| 7,651,294 B2 | 1/2010 | Maier |
| 8,033,750 B2 | 10/2011 | Vitale et al. |
| 8,048,333 B2 | 11/2011 | Vitale et al. |
| 8,066,448 B2 | 11/2011 | Vitale et al. |
| 8,070,383 B2 | 12/2011 | Vitale et al. |
| 8,070,384 B1 | 12/2011 | Vitale et al. |
| 8,070,979 B2 | 12/2011 | Vitale et al. |
| 8,070,980 B2 | 12/2011 | Vitale et al. |
| 8,104,991 B2 | 1/2012 | Vitale et al. |
| 8,132,982 B2 | 3/2012 | Vitale et al. |
| 2004/0011102 A1 | 1/2004 | Sears |
| 2004/0035162 A1 | 2/2004 | Williams et al. |
| 2004/0074271 A1 | 4/2004 | Krysiak et al. |
| 2004/0234682 A1 | 11/2004 | Hawkins et al. |
| 2004/0245494 A1 | 12/2004 | Horman et al. |
| 2004/0260017 A1 | 12/2004 | Mertens et al. |
| 2005/0090401 A1 | 4/2005 | Sakane et al. |
| 2005/0124527 A1 | 6/2005 | Hawkins et al. |
| 2005/0150417 A1 | 7/2005 | Hirsbrunner et al. |
| 2006/0020058 A1 | 1/2006 | Grawe et al. |
| 2006/0048670 A1 | 3/2006 | Al-Rashed |
| 2006/0075928 A1 | 4/2006 | Richards et al. |
| 2006/0128839 A1 | 6/2006 | Ferrall et al. |
| 2006/0156961 A1 | 7/2006 | Langford |
| 2007/0037925 A1 | 2/2007 | Weitzel et al. |
| 2007/0135561 A1 | 6/2007 | Rath et al. |
| 2007/0286903 A1 | 12/2007 | Becicka |
| 2008/0028890 A1 | 2/2008 | Hey et al. |
| 2008/0038470 A1 | 2/2008 | Hagens et al. |
| 2008/0087305 A1 | 4/2008 | Cotter |
| 2008/0185160 A1 | 8/2008 | Diener et al. |
| 2009/0090890 A1 | 4/2009 | Nguyen |
| 2009/0169901 A1 | 7/2009 | Blacklidge |
| 2009/0189113 A1 | 7/2009 | Lamperd et al. |
| 2009/0211491 A1 | 8/2009 | Ogata et al. |
| 2009/0301302 A1 | 12/2009 | Weatherman et al. |
| 2009/0301863 A1 | 12/2009 | Swanson, Jr. et al. |
| 2009/0318602 A1 | 12/2009 | Deneuvillers |
| 2010/0047015 A1 | 2/2010 | Takamura et al. |
| 2010/0075029 A1 | 3/2010 | Wilson, Jr. |
| 2010/0112329 A1 | 5/2010 | Yi |
| 2012/0207551 A1* | 8/2012 | Guilbault et al. ............ 405/263 |

FOREIGN PATENT DOCUMENTS

| | | |
|---|---|---|
| EP | 2 083 121 | 7/2009 |
| GB | 2 142 552 | 1/1985 |
| JP | 49 7899 | 2/1974 |
| JP | 04 142390 | 5/1992 |
| JP | 07 042210 | 5/1995 |
| JP | 2109781 | 11/1996 |
| KR | 10 2000 0060661 | 10/2000 |
| WO | 00 15715 | 3/2000 |
| WO | 02 02715 | 1/2002 |
| WO | 2006 041581 | 4/2006 |
| WO | 2006 063159 | 6/2006 |
| WO | 2006 068467 | 6/2006 |
| WO | 2007 0146317 | 12/2007 |
| WO | 2008 011368 | 1/2008 |
| WO | 2008 070234 | 6/2008 |
| WO | 2009 137299 | 11/2009 |
| WO | 2010 025518 | 3/2010 |

OTHER PUBLICATIONS

ROHMAX Additives GmbH, "Viscoplex 10-131," Data Sheet, Jul. 2004, www.rohmax.com.

Midwest Industrial Supply, Inc., "Envirokleen Gravel Runways Fines Preservation," unknown publication, unknown date, www.midwestind.com.

Midwest Industrial Supply, Inc. "EK35 Gravel Runways Fines Preservation," unknown publication, unknown date, www.midwestind.com.

Geotechnical Laboratory of Advanced Geotechnical Testing AGT, LLC, "Kipnik Soil Evaluation Stabilized Sub-Grade Apron Development," AGT Project No. 3407159, Sep. 2007.

University of Alaska Fairbanks, Hazirbaba, Connor, Davis, Zhang, "Final Report: The Use of Geofiber and Synthetic Fluid for Stabilizing Marginal Soils," INE Project No. RR07.03, Oct. 1, 2007.

Tracey, Tsou, "Dynamically Vulcanized Alloy Innerliners," Rubber World Magazine, ISSN 0035-9572, Sep. 1, 2007.

University of Alaska Fairbanks, Misc. Authors, Newsletter vol. 1, No. 2, Feb. 2008.

Wacker Silicones, "Drysoil in Landscaping Application, Creating Tomorrow's Solutions," Apr. 1, 2008.

Copeland, Eisele, Chesney, Kawatra, "Factors Influencing Dust Suppressant Effectiveness," Minerals & Metallurgical Processing, 25(4): 215-222, Nov. 2008.

Kavouras, Etyemezian, Nikolich, Gilles, Sweeney, Young, Shafer, "A New Technique for Characterizing the Efficacy of Fugitive Dust Suppressants," Journal of the Air & Waste Management Association, 59 (5): 603-612, May 2009.

Edvardsson, "Gravel Roads and Dust Suppression," Road Materials and Pavement Design, 10(3): 439-469, Jul.-Sep. 2009.

Goodrich, Koski, Jacobi, "Monitoring Surface Water Chemistry Near Magnesium Chloride Dust Suppressant Treated Roads in Colorado," Journal of Environmental Quality, 38(6): 2373-2381, Nov.-Dec. 2009.

Marais, Thompson, Visser, "Managing Mine Road Maintenance Interventions Using Mine Truck On-Board Data," The Southern African Institute of Mining and Metallurgy, Surface Mining 2008.

Thompson, Visser, "Mine Haul Road Maintenance Management Systems," unknown publication, unknown date.

Thompson, Visser, Van Den Bert, Bosch, "Towards a Mechanistic Structural Design Method for Surface Mine Haul Roads," Journal of the South African Institution of Civil Engineers, vol. 38, No. 2, Second Quarter 1996, pp. 13-21.

Thompson, Visser, "Mine Haul Road Fugitive Dust Emission and Exposure Characterisation," unknown publication, Jan. 2001.

Thompson, Visser, "Benchmarking and Managing Surface Mine Haul Road Fugitive Dust Emissions," unknown publication, Mar. 2002.

Hugo, Heyns, Thompson, Visser, "Haul Road Condition Monitoring using Vehicle Response Measurements," ICSV, Jul. 2005.

Thompson, Visser, "The Impact of Rolling Resistance on Fuel, Speed and Costs," HME 2006: Continuous Improvement Case Studies, 2006.

Thompson, Visser, "Selection and Maintenance of Mine Haul Road Wearing Course Materials," Mining Technology, 2006, vol. 115, No. 4, pp. 140-153.

Thompson, Visser, "Selection Performance and Economic Evaluation of Dust Palliatives on Surface Mine Haul Roads," The Journal of the Southern African Institute of Mining and Metallurgy, vol. 107, Jul. 2007, pp. 1-16.

Thompson, Visser, "Final Project Report COL467: The Reduction of the Safety and Health Risk Associated with the Generation of Dust on Strip Coal Mine Haul Roads," University Pretoria, Departments of Mining and Civil Engineering, Jan. 2000.

Edil, Benson, "Sustainable Construction Case History: Fly Ash Stabilization of Road-Surface Gravel," University of Wisconsin-Madison, Geological Engineering Program, Dept. of Civil and Environmental Engineering, 2007 World of Coal Ash (WOCA), May 7-10, 2007.

Liu, J., Shi,B.,Jiang, H., Bae, S., Huang, H., "Improvement of Water-Stability of Clay Aggregates Admixed with Aqueous Polymer Soil Stabilizers" Catena, vol. 77, Issue 3, Jun. 15, 2009, p. 175-179.

Collins, R.W., "Stabilization of Marginal Soils using GeoFibers and NonTraditional Additives" Thesis presented to Faculty of University of Alaska Fairbanks, Fairbanks, Alaska, Aug. 2011, 109 Pages.

* cited by examiner

METHOD AND COMPOSITION FOR MODIFYING SOIL AND DUST CONTROL

I. CROSS-REFERENCE TO RELATED APPLICATIONS

This application is a continuation of U.S. Ser. No. 13/231,492, filed Sep. 13, 2011, now U.S. Pat. No. 8,210,769, which is a continuation-in-part of U.S. Ser. No. 12/729,683, filed Mar. 23, 2010, now U.S. Pat. No. 8,033,750, which claims priority to Provisional Patent Application No. 61/165,235 filed Mar. 31, 2009, Provisional Patent Application No. 61/169,041 filed Apr. 14, 2009, and Provisional Patent Application No. 61/309,223 filed Mar. 1, 2010, all of which are incorporated herein by reference.

II. BACKGROUND

This invention generally relates to methods and compositions for improving the strength and longevity of secondary roadways through environmentally sound practices; specifically, improved dust suppression, soil stabilization, and water repellency.

The engineering and construction of secondary roads (hereafter, "gravel roads," "earth roads," or "unpaved roads") has been perpetually plagued by two interrelated problems: the deterioration of the road due to water, and the loss of surface cohesion and road compaction due to traffic. The deleterious effects of water on roadways, in particular, are well documented in the prior art. In cold weather, moisture that penetrates a road's base layers freezes and rips cracks into the road substrate that seriously undermine the load bearing capacity and longevity of the roadway. Likewise, in milder weather, when water seeps into the road's base layers it results in softening and erosion that causes potholes that are an expensive and recurring problem. And if the potholes are not immediately repaired, they fill with water and further exacerbate the deterioration of the roadway.

The impact of water on secondary roads such as rural roads, access roads, field and forestry roads, or mountain roads is especially pronounced because the quality of the surfacing materials is lower than in an asphalt paved road, for example, and thus provides reduced surface protection from the elements. Additionally, because of capillary action, water also seeps into the road base from the sides and bottom of the road's base or sub-base. Compared to sealed or "paved" roads, which require large machinery to pour concrete or to lay and smooth a bitumen-based surface, secondary unpaved roads are relatively easy and inexpensive to build. But unpaved roads require much more frequent maintenance—particularly after wet periods or when faced with increased traffic—and are generally prone to other problems not associated with paved roads.

For example, many secondary roads—of either an earth or gravel variety—utilize native soils, often in conjunction with gravel quarried from local resources, to create the road's sub-base and base layers. Unfortunately, native soils and gravel are not always of suitable quality, resulting in a road base with diminished physical and mechanical properties. When secondary roads are constructed of poor road base materials, routine maintenance is not strictly employed, and the road is exposed to heavy moisture and/or traffic, the erosion of the road—due to damage to the road surface, sub-base, and base materials—is hastened.

Defects in road surfaces are typically classified into two categories: surface deterioration and surface deformation. While surface deterioration is related mostly to the quality of the surfacing materials and the way they respond to weather or traffic stresses, surface deformations often have combined causes that include both stresses to the road surface itself and other factors such as sub-base and base capacity and stability.

Surface deterioration is exemplified by "dust," the result of loss of fine binder material from road surfaces. Dust is a substantial problem for secondary roads, as the loss of these fine materials leads to other types of road distress such as loss of cohesion and compaction of the road fill material, and reduced capacity to maintain the requisite moisture in the road fill.

Surface deformations include ruts, corrugations, depressions, and potholes. Ruts are longitudinal depressions in the wheel paths caused by high moisture content, inadequate strength in the subsurface soil or base, inadequate surface course thickness, or heavy traffic loads. Corrugating or "washboarding" is a series of ridges and depressions across the road surface caused by lack of surface cohesion. Depressions are localized low areas one or more inches below the surrounding road surfaces that are caused by settlement, excessive moisture content, and/or improper drainage. Potholes are small depressions or voids in the road surface one or more inches deep which are caused by excessive moisture content, poor drainage, weak sub-base or base, poorly graded aggregate, or a combination of these factors.

As such, the problems typically associated with secondary roads—both surface deterioration and deformation—are caused by: 1) the harmful effects of water and high moisture content, including settlement and erosion, on the road surface and base. 2) the lack of surface cohesion and resulting loss of road compaction caused by dust, and 3) the heavy traffic loads exerted on roads with weak or inadequate soil, sub-base, or base.

Industry has provided for the addition of various chemical additives to impart water repellency on road materials, with varying degrees of success and environmental impact. However, water repellant chemicals are not binders, and load bearing capacity and stability are not improved by their application to the soil or road base. In many cases, dust can also be reduced on gravel roads by applying chemical additives (commonly known in the art as "dust suppressors" or "dust retardants") which draw moisture from the air to improve fine aggregate cohesion. And "soil stabilizers," which are chemicals designed to act as binders and coalesce forming bonds between the soil or aggregate particles, have shown promise in greatly improving the load bearing and traffic capacity of the road. But existing soil stabilizers and dust retardants are difficult to apply and use in cold climates, tend to have long cure times, short life-cycles, and do not provide the requisite protection against water damage; particularly excessive moisture content resulting from capillary action.

Therefore, a single chemical composition capable of resisting the aforementioned problems—by providing water repellency for reduced moisture content, dust retardant for improved surface cohesion, and soil stabilizers for improved load bearing and traffic capacity—would be of great utility in the field of art; particularly if the chemical composition could be applied in an economical and environmentally sound manner. Although road builders have long employed soil additives as a mechanism for preventing and avoiding surface deteriorations and deformations, formulating a combination of chemicals and a methodology for applying the chemical additives in a cost-effective manner has proved elusive. Specifically, although various chemicals have been provided for binding road base materials together for improved strength and load bearing capacity and for repelling water from the road surface, previous efforts have thus far failed to provide an environmentally appropriate solution to the secondary road erosion and maintenance issues that have long plagued the art. Thus, there is a need in the art for improved compositions that provide extraordinary increases in load bearing capacity, outstanding dust retardant capabilities, superior water repellant properties, and can be administered in a single application phase. Such an improved composition could provide an engineered stabilized water repellant road base and surface topping for earth or gravel roads; or, it could prepare a road sub-base or base for chip sealing, paving, or milling applications.

Repairing damaged roadways by conventional methods can be extremely expensive, time consuming, and environmentally disruptive because the entire compacted gravel layer of the road must be replaced. Excavating the roadbed of a 1-km portion of road measuring 4 m in width produces about 2000 cubic meters ($m^3$) of earthy waste; in a conventional road bed repair project, this would require roughly 220 truckloads of waste to be removed from the worksite, with 220 truckloads of new gravel being shipped back the worksite to complete the project. In isolated locations, or locations with difficult terrain, the expense of removing and later replacing the gravel is exorbitant—as is the impact on local residents (who must cope with noise and air pollution), normal users of the roadway (who experience detours or extended delays during repair), and the landfills that store the removed waste.

As a result, there is a need in the art for a single phase chemical treatment method that incorporates soil stabilization, dust retardant, and water repellant chemicals into native soils. With such a single phase treatment option, road builders will be able improve the longevity of the roadway, impart increased load bearing and traffic capacity, and reduce the time, costs, and environmental impact associated with conventional road repair projects.

III. BRIEF DESCRIPTION OF THE DRAWINGS

At least one embodiment of the invention is set forth in the following description and is shown in the drawings and is particularly and distinctly pointed out and set forth in the appended claims.

IV. SUMMARY

Figure 1:
FIG. 1 shows a pulvimixer.
Figure 2:
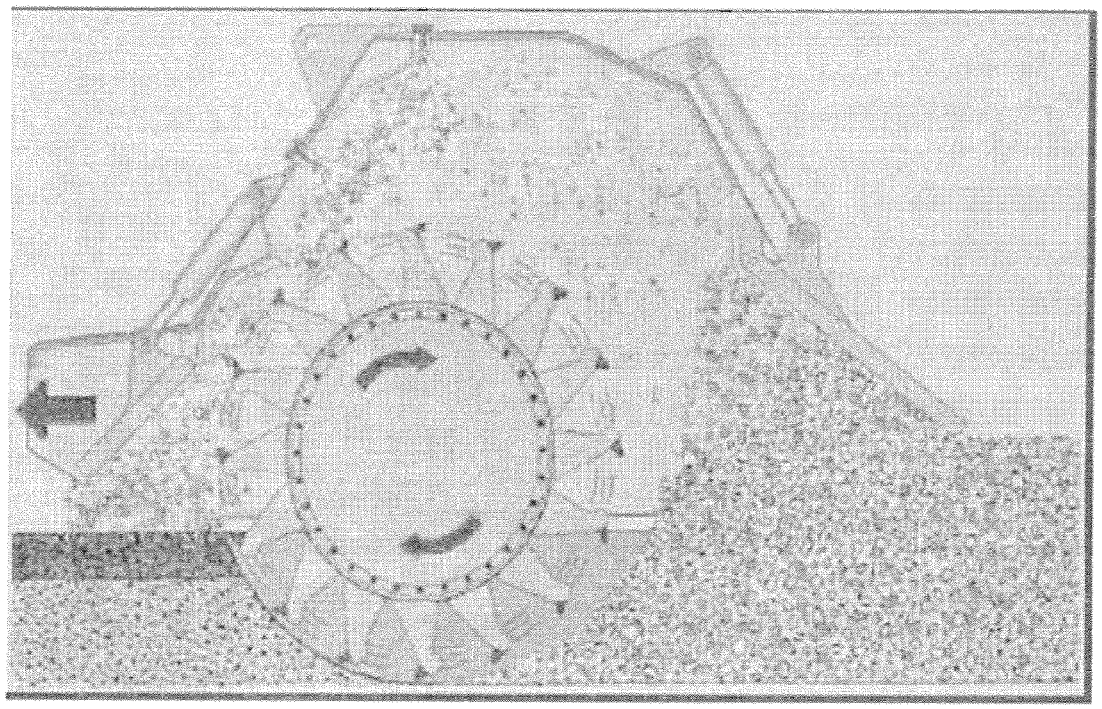
FIG. 2 shows a side view of the pulvimixer, wherein the soil or road base materials are being pulverized, sprayed, and mixed with the chemical composition of the present invention.
Figure 3:
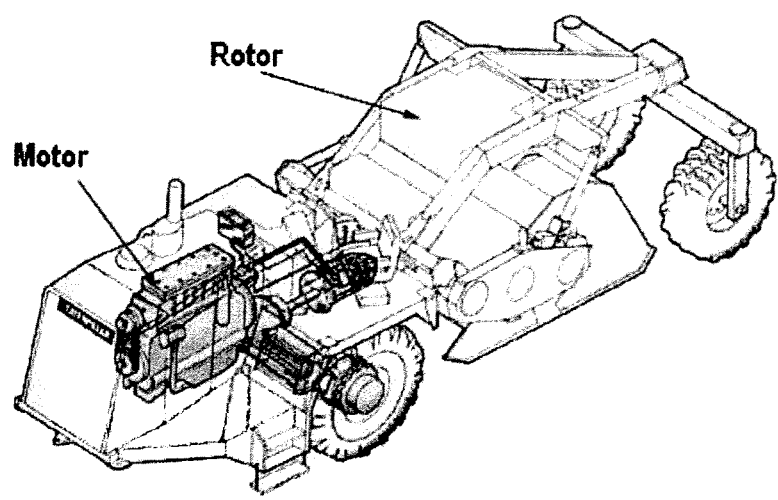
FIG. 3 shows a perspective view of the pulvimixer.

Accordingly, several objects and advantages of the present invention are the provision of a single chemical soil or road base material improvement composition that imparts extraordinary dust control, soil stabilization, and water repellency properties onto native soils or other road base materials.

Additionally, the present invention provides a method for a single application phase treatment of soil or road base materials characterized by reduced cure time, decreased road construction time, reduced environmental impact (by virtue of reduced construction waste and traffic), a wider range of effective use temperatures, a long life cycle, and a stronger more dust resistant roadway.

Other benefits and advantages will become apparent to those skilled in the art to which it pertains upon reading and understanding of the following detailed specification.

V. DETAILED DESCRIPTION

In one embodiment of the present invention, a composition for improving the properties of soil or other road base materials is provided. Specifically, a blended mixture of the chemical composition detailed below is capable of improving the dust retardant, water repellant, and soil stabilization properties of soil or other road base materials. Incorporating the chemical improvement composition into soil, or other road base materials, and then compacting, provides superior resistance to surface deformations and deterioration by increasing the load-bearing strength—in some cases, as much as 500%—of the roadway, greatly reducing dust caused by traffic or weather, and eliminating capillary water uptake that results in moisture damage to the road. This invention is an improvement over traditional methods because it provides a composition that can be applied in a single application phase, under a wide range of ambient temperatures and conditions, to resolve all of the above problems in the field of art.

The composition for chemical improvement of soil or road base materials is comprised of an aqueous solution of a water repellant in combination with an aqueous emulsion of a soil stabilizer and dust retardant. In one embodiment of the present invention, the characteristics of the composition for chemical improvement of soil or road base materials can include an aqueous solution of a water repellant that comprises about 1.0% to about 5.0% by weight (including, but not limited to, 1, 2, 3, 4, and 5) of potassium hydroxide; about 10.0% to about 30.0% by weight (including, but not limited to, 10, 11, 12, 13, 14, 15, 16, 17, 18, 19, 20, 21, 22, 23, 24, 25, 26, 27, 28, 29, and 30) of potassium methylsiliconate; and about 65.0% to about 89.0% by weight (including, but not limited to, 65, 66, 67, 68, 69, 70, 71, 72, 73, 74, 75, 76, 77, 78, 79, 80, 81, 82, 83, 84, 85, 86, 87, 88, and 89) of water. In yet another embodiment of the invention, instead of the aforementioned potassium methylsiliconate, the aqueous solution of a water repellant comprises about 10.0% to about 30.0% by weight (including, but not limited to, 10, 11, 12, 13, 14, 15, 16, 17, 18, 19, 20, 21, 22, 23, 24, 25, 26, 27, 28, 29, and 30) of sodium methylsiliconate.

In one embodiment of the present invention, the characteristics of the composition for chemical improvement of soil or road base materials can include a dust suppression and/or soil stabilization composition that is an aqueous emulsion comprising about 5.0% to about 60.0% by weight (including, but not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60) of polyacrylic acid and polyvinyl acetate and 40.0% to about 95.0% by weight (including, but not limited to, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90) of water. It is to be understood that this embodiment could consist of straight acrylic, straight polyvinyl acetate or an SBR (styrene butadiene rubber), all in blends, copolymers, or homopolymers.

In another embodiment of the invention, the composition for chemical improvement of soil or road base materials can comprise about 2.5% to about 30.0% by weight (including, but not limited to, 2.5, 2.6, 2.7, 2.8, 2.9, 3, 4, 5, 6, 7, 8, 9, 10, 11, 12, 13, 14, 15, 16, 17, 18, 19, 20, 21, 22, 23, 24, 25, 26, 27, 28, 29, and 30) of polyacrylic acid and polyvinyl acetate polymer; about 0.5% to about 2.5% by weight (including, but not limited to, 0.5, 0.6, 0.7, 0.8, 0.9, 1.1, 1.2, 1.3, 1.4, 1.5, 1.6, 1.7, 1.8, 1.9, 2.0, 2.1, 2.2, 2.3, 2.4, and 2.5) of potassium hydroxide; about 5.0% to about 15.0% by weight (including, but not limited to, 5, 6, 7, 8, 9, 10, 11, 12, 13, 14, and 15) of potassium methylsiliconate; and about 52.5% to about 92.0% by weight (including, but not limited to, 52.5, 52.6, 52.7, 52.8, 52.9, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, and 92) of water.

In yet another embodiment of the invention, the composition for chemical improvement of soil or road base materials can comprise about 3.75% to about 45.0% by weight (including, but not limited to, 3.75, 3.76, 3.77, 3.78, 3.79, 3.8, 3.9, 4, 5, 6, 7, 8, 9, 10, 11, 12, 13, 14, 15, 16, 17, 18, 19, 20, 21, 22, 23, 24, 255, 26, 27, 28, 29, 30, 31, 32, 33, 34, 35, 36, 37, 38, 39, 40, 41, 42, 43, 44, and 45) of polyacrylic acid and polyvinyl acetate polymer; about 0.25% to about 1.25% by weight (including, but not limited to, 0.25, 0.26, 0.27, 0.28, 0.29, 0.3, 0.4, 0.5, 0.6, 0.7, 0.8, 0.9, 1.0, 1.1, 1.20, 1.21, 1.22, 1.23, 1.24, and 1.25) of potassium hydroxide; about 2.5% to about 7.5% by weight (including, but not limited to, 2.5, 2.6, 2.7, 2.8, 2.9, 3, 4, 5, 6, 7, 7.1, 7.2, 7.3, 7.4, and 7.5) of potassium methylsiliconate; and about 46.25% to about 93.5% by weight (including, but not limited to, 46.25, 46.26, 46.27, 46.28, 46.29, 46.3, 46.4, 46.5, 46.6, 46.7, 46.8, 46.9, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93.0, 93.1, 93.2, 93.3, 93.4, and 93.5) of water.

In still another embodiment of the invention, the composition for chemical improvement of soil or road base materials can comprise about 1.25% to about 15.0% by weight (including, but not limited to, 1.25, 1.26, 1.27, 1.28, 1.29, 1.3, 1.4, 1.5, 1.6, 1.7, 1.8, 1.9, 2, 3, 4, 5, 6, 7, 8, 9, 10, 11, 12, 13, 14, and 15) of polyacrylic acid and polyvinyl acetate polymer; about 0.75% to about 3.75% by weight (including, but not limited to, 0.75, 0.76, 0.77, 0.78, 0.79, 0.8, 0.9, 1, 2, 3, 3.1, 3.2, 3.3, 3.4, 3.5, 3.6, 3.70, 3.71, 3.72, 3.73, 3.74, and 3.75) of potassium hydroxide: about 7.5% to about 22.5% by weight (including, but not limited to, 7.5, 7.6, 7.7, 7.8, 7.9, 8, 9, 10, 11, 12, 13, 14, 15, 16, 17, 18, 19, 20, 21, 22.0, 22.1, 22.2, 22.3, 22.4, and 22.5) of potassium methylsiliconate; and about 58.75% to about 90.5% by weight (including but not limited to, 58.75, 58.76, 58.77, 58.78, 58.79, 58.8, 58.9, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90.0, 90.1, 90.2, 90.3, 90.4, and 90.5) of water. It is to be understood that this embodiment could comprise mixtures, copolymers, or homopolymers of acrylics, polyvinyl acetates, styrene butadiene rubbers, and styrene acrylics.

In still other embodiments of the present invention, the dust suppression and/or soil stabilization portion of the composition can also include an emulsifier. Furthermore, in certain embodiments of the invention, the polyacrylic acid and/or polyvinyl acetate can comprise a mixture of homopolymers, or can comprise one or more copolymers. Some embodiments may include styrene butadiene rubber and related compositions, copolymers, and/or derivatives thereof. The chemical compositions described above are manufactured using conventional manufacturing equipment. Conventional mixers, emulsifiers, or colloid mills are utilized to blend these components into stable heterogeneous mixers or emulsions.

According to embodiments where the polyacrylic acid and/or polyvinyl acetate components comprise homopolymers, the homopolymer components can be present in ratios from about 1:1 to about 1:10,000 by mass of polyacrylic acid to polyvinyl acetate; or, from about 1:1 to about 1:10,000 by mass of polyvinyl acetate to polyacrylic acid.

According to embodiments where the polyacrylic acid and/or polyvinyl acetate components comprise one or more copolymers, the copolymers can comprise random copolymers, block copolymers, graft copolymers and the like or any combination thereof. Furthermore, the ratio of acrylic acid units to vinyl acetate units within a copolymer can comprise from about 1:1 to about 1:10,000 by mass of acrylic acid units to vinyl acetate units; or, from about 1:1 to about 1:10,000 by mass of vinyl acetate units to acrylic acid units.

Regardless of whether the embodiment comprises homopolymers and/or copolymers, each polymer component can be present in a wide variety of molecular weights and polydispersities thereof. For instance, suitable molecular weight ranges can comprise from about $10^3$ to about $10^4$ g/mol, from about $10^4$ to about $10^5$ g/mol, from about $10^5$ to about $10^6$ g/mol, from about $10^6$ to about $10^7$ g$_\mu$mol, from about $10^7$ to about $10^8$ g/mol, from about $10^8$ to about $10^9$ g/mol, or even from about $10^9$ to about $10^{10}$ g/mol. Here, as elsewhere in the specification and claims, ranges may be combined. Furthermore, the foregoing molecular weight ranges can be calculated according to any method known in the art including, without limitation, weight average molecular weight and number average molecular weight. One of skill in the art will recognize that the numerical value of a polymer molecular weight differs according to the calculation method.

A composition according to the aforementioned embodiments can comprise a dust suppression, soil stabilization, and/or water repellant composition that can, for instance, be applied to unpaved road surfaces (either soil, earth, dirt, gravel, or other conventional aggregate substances). Such compositions may decrease the amount of dust caused by wind erosion or generated by vehicles operating on the unpaved surface. Other embodiments can alternatively or additionally comprise a soil stabilization composition that increases the California Bearing Ratio (CBR value) and R-value of the soil or road base. In still other embodiments, the composition can alternatively or additionally comprise a water repellant component that eliminates, or greatly reduces, capillary water uptake into road surfaces, bases, and sub-bases. Accordingly, such compositions can increase the weight-bearing capacity of an unpaved road surface, prevent erosion thereof, prevent water uptake thereof, or otherwise enhance the mechanical characteristics of the soil to which it is applied.

In several embodiments of the present invention, methods for improving soil or road base materials are provided. In one embodiment, a heterogeneous mixture of an aqueous solution of a water repellant and aqueous emulsion of a soil stabilizer and dust retardant—according to the various chemical embodiments described above—is provided and applied to soil or road base materials (thereafter, "treated soil or road base materials"). As used in this patent application, the term "soil" is broadly used to describe the top layer of the earth's surface, consisting of rock and mineral particles mixed with organic matter (also known as, by non-limiting reference, earth or dirt); whether originally located at the road construction site ("native soil" or "in situ soil") or transported to the road construction site. As used in this patent application, the phrase "road base materials" is broadly used to describe any substance from which a road surface, base, or sub-base could be constructed; including, but certainly not limited to by this non-limiting reference, rock, broken rock, gravel (whether pebble, granule, or other size or mixture), sand, cobble, slag, or other construction aggregate or fill material. In these embodiments, the material being treated is graded prior to application. Soil high in organic matter, because it is not cohesive, creates some difficulties establishing the reaction necessary to render the soil hydrophobic. The manner of composition application can include any method chosen with sound engineering judgment; but in most instances, application of the chemical agent to the soil is accomplished by the use of conventional spray equipment (spray trucks). The agent is gravity fed or pumped through hoses, spray nozzles, or fixed sprayers and evenly applied to the soil or material to be treated.

In some embodiments of the invention, the soil or road base materials are scarified (ripped open)—in this embodiment, to a depth of about 4-6 inches (10.16 cm-15.24 cm)—by conventional road construction graders (particularly graders with rake attachments) prior to application of the soil or road base material chemical improvement composition. This has the effect of allowing the composition to penetrate and permeate the soil or road base material to a greater degree. Once applied, the composition penetrates into the soil or road base materials where particle weighting and loading mechanisms achieved through the processes of adsorption, prompt adherence of molecules to the surface of particles and absorption and penetration of the substance into the inner structure of the particles. The water repellant portion of the composition reacts with minerals in the soil or road base materials and rapidly forms a hydrophobic silicone resin network that does not close pores in the substances, but rather permits the road to "breathe" in spite of water repellant properties. During the inventive process, evaporation of water occurs. The polymers of the aqueous acrylic polymer emulsion coalesce and form an intimate bond with the soil upon evaporation of the water. The sodium silicate and potassium silicate in water uses cohesion of the soil particles to form discrete hydrophobic silicone networks.

In one embodiment of the invention, the treated soil or road base materials are graded and compacted, using any means chosen with sound engineering judgment, and a top coat of the composition is applied. Motor-graders, asphalt grinders, mixers, pug mills, compactors, rollers, and other conventional construction equipment may be utilized to blend, set grade, and compact stabilized base, if necessary, as described in herein. A top coat is defined broadly as any application of the soil or road base materials chemical improvement composition that is applied after compaction.

In one embodiment, penetration is dramatically improved by mechanically mixing the chemical composition into soil or road base materials during the application step. The mechanical mixing process can include, but is not limited to, the use of a specialized machine called a "pulvimixer" (The pulvimixer consists of an engine which directly drives a toothed rotor, whose teeth are replaced when they are damaged. In one embodiment, the rotor is horizontal and turns at a rate of 100 to 200 rpm in the opposite direction to the machine's direction of travel and digs into the soil to depth of 500 mm, mixing the binder (enhanced polymers) thoroughly with the clays or silts that make up the soil. This technique allows soils to be exploited structurally). The pulvimixer mechanically mixes the composition with the soil or road base materials by simultaneously: 1) scarifying the soil or road base materials, which when accomplished by a pulvimixer can additionally include breaking up (pulverizing) large pieces of stone or road topping in a mixing chamber; (2) applying the chemical improvement composition; (3) thoroughly mixing the chemical improvement composition with the pulverized soil or road base material; and (4) grading the treated soil or road base material. This single application phase method prepares the treated soil or road base material—which is now a thoroughly mixed, homogeneous, well-graded roadbed—for leveling and compaction. In some embodiments of the invention, a top coat is then applied to the mechanically mixed and compacted soil or road base materials. In other embodiments, a surface course is applied to the compacted soil or road base materials prior to application of the top coat. A surface course can include any combination of road surface materials used in the art; including, but not limited to, asphalt concrete and bituminous surface treatments such as chip seal.

Effective application amounts of some embodiments can comprise from about 1 liter per cubic meter of soil (i.e. 1 $L/m^3$) to about 10 $L/m^3$, from about 10 $L/m^3$ to about 20 $L/m^3$, from about 20 $L/m^3$ to about 30 $L/m^3$, from about 30 $L/m^3$ to about 40 $L/m^3$, from about 40 $L/m^3$ to about 50 $L/m^3$, from about 50 $L/m^3$ to about 60 $L/m^3$, from about 60 $L/m^3$ to about 70 $L/m^3$, from about 70 $L/m^3$ to about 80 $L/m^3$, from about 80 $L/m^3$ to about 90 $L/m^3$, from about 90 $L/m^3$ to about 100 $L/m^3$, or even greater than 100 $L/m^3$.

The proper application of the chemical compositions for improvement of soil or road base materials of the present invention, particularly using the methodologies described above, greatly improves the load bearing strength of unpaved roads, makes them virtually resistant to the damaging effects of capillary water uptake and water erosion, and provides superior dust retardant properties—under a wider range of effective application and use temperatures—than any composition in the prior art. Moreover, the chemical compositions described and claimed herein can be applied in a single phase to native soils, and due to reduced cure times the result is decreased road construction time, reduced environmental impact (by virtue of reduced construction waste and traffic), and a longer life cycle.

Figure 4:
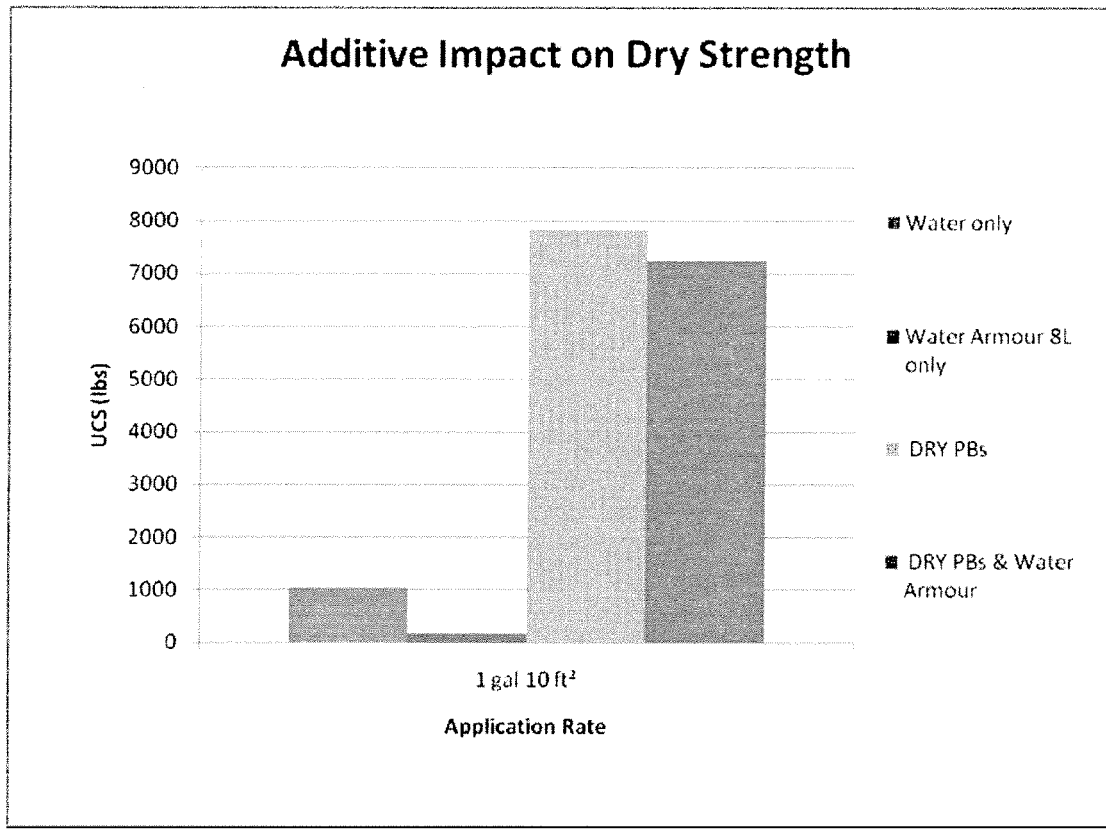
FIG. 4 shows a graph showing additive impact on dry strength.
Figure 5:
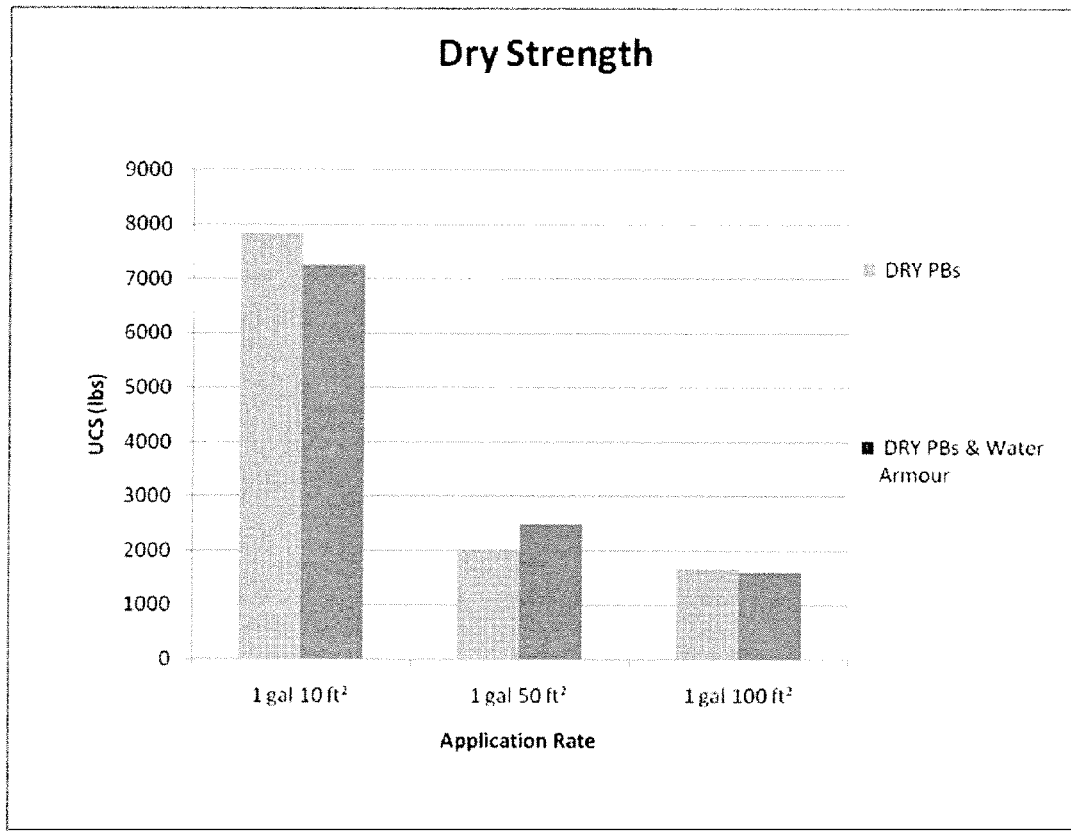
FIG. 5 shows a graph showing dry strength.
Figure 6:
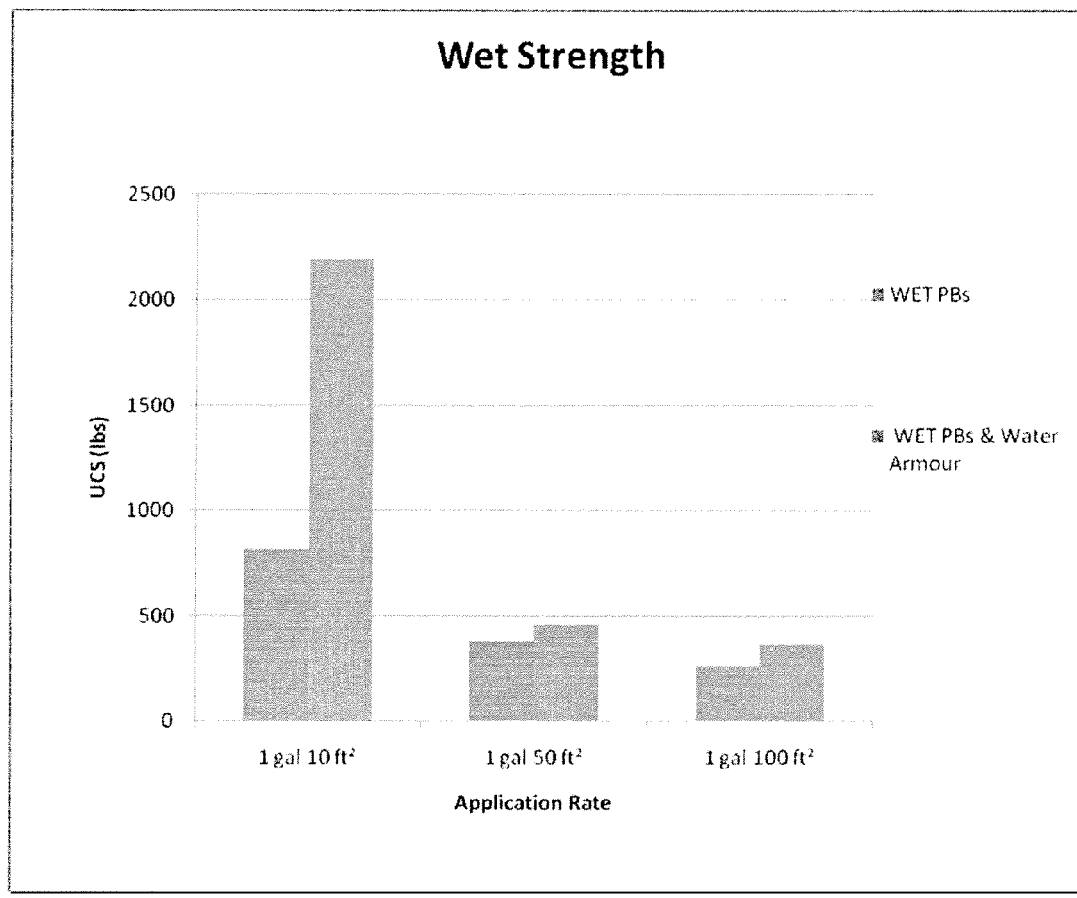
FIG. 6 shows a graph showing wet strength.

With reference now to FIGS. 4-6, standard lab mix of well graded limestone was used to prepare all unconfined compressive strength (UCS) cores. All samples were prepared using standard lab practices for making UCS cores. All samples were dried at 104° F. (219° C.) for 48 hours. Dry UCS cores were broken after six hours at room temperature. Wet UCS cores were broken after 48 hour soak in room temperature tap water, immediately after removal from water bath. Standard UCS cores are typically three inches (7.62 cm) in diameter and compacted to a four inch (10.16 cm) depth. Application rates of polymer (PBs) are based on surface area. In these embodiments, Water Armour® a sodium silicate and potassium silicate in water) was applied at a rate of 8 $L/m^3$ on all samples. In FIG. 4 the graph shows the impact of the addition of each of the additives, alone and together, on the UCS strength of standard limestone. The Water Armour® alone has a negative impact on the strength of the cohesive limestone mix. The addition of polymer alone and polymer and Water Armour® substantially increase the UCS values.

In FIG. 5, the graph shows that the addition of Water Armour® to the polymer has a negligible impact on the strength of the polymer/limestone mix alone. In FIG. 6, the graph shows that the addition of Water Armour® has a positive impact on the wet strength of the polymer/limestone mix. Testing shows at least a 17% increase in wet strength. Below is a table showing the results of the tests on the graphs.

TABLE 1

| | Dry SS/WA | | | Wet SS/WA | | |
|---|---|---|---|---|---|---|
| | 1 gallon/ 10 ft$^2$ | 1 gallon/ 50 ft$^2$ | 1 gallon/ 100 ft$^2$ | 1 gallon/ 10 ft$^2$ | 1 gallon/ 50 ft$^2$ | 1 gallon/ 100 ft$^2$ |
| | 7965 | 2584 | 1559 | 2044 | 378 | 358 |
| | 7672 | 2391 | 1817 | 2044 | 436 | 384 |
| | 6122 | | 1445 | 2498 | 573 | 356 |
| Avg.: | 7253 | 2488 | 1607 | 2195 | 462 | 366 |

SS—Soil Sement ® (an aqueous acrylic vinyl acetate polymer emulsion
WA—Water Armour ®

TABLE 2

| | Dry SS 40% solids | | | Wet SS 40% solids | | |
|---|---|---|---|---|---|---|
| | 1 gallon/ 10 ft$^2$ | 1 gallon/ 50 ft$^2$ | 1 gallon/ 100 ft$^2$ | 1 gallon/ 10 ft$^2$ | 1 gallon/ 50 ft$^2$ | 1 gallon/ 100 ft$^2$ |
| | 8282 | 2019 | 1557 | 1090 | 444 | 258 |
| | 7886 | 1835 | 1575 | 639 | 370 | 234 |
| | 8363 | 2179 | 1666 | 709 | 318 | 278 |
| | 7738 | 2143 | 1941 | 725 | 460 | 210 |
| | 6920 | 1965 | 1652 | 907 | 315 | 323 |
| Avg.: | 7838 | 2028 | 1678 | 814 | 381 | 261 |

Along with the testing shown in Tables 1 and 2, a control of water only was also run at 1 gallon per 10 square feet, with a result of 1050. Also, a control of 8 L of Water Armour® was also run with a result of 166.

In one example, aqueous acrylic vinyl acetate polymer emulsion was mixed and blended with the soil. A container had 3200 gallons (12,113 liters) of the emulsion diluted 11 to 1 with water. The scarified road was very dry through the entire 6-8 inch (15.24 cm-20.32 cm) depth. The emulsion soaked into the material. Another coat was applied, which soaked in even slower. The following day, the first section looked good. The ruts were almost not visible. A total of 550 gallons (2082 liters) had been applied to this first section, which was the 40% solids section. A second section was the 50% solids section, which was also 250 m×4.5 m. This section had 605 gallons (2290 liters) applied at 50%.

On the second day, sections 1 and 2 looked good after light traffic. Both sections appeared still at least damp, but held firm. A third section would have both the emulsion and Water Armour® applied. This section was 100 m×4.5 m and was 6 inches (15.24 cm) deep. Approximately 100 gallons (376 liters) of Water Armour® was mixed with 275 gallons (1041 liters) of the emulsion and filled the rest of the 3200 gallon (12,113 liters) tank with water. This was applied to the material. When it was dry a second coat was applied. Material was very tight and had an even, white sheen.

Figure 7:
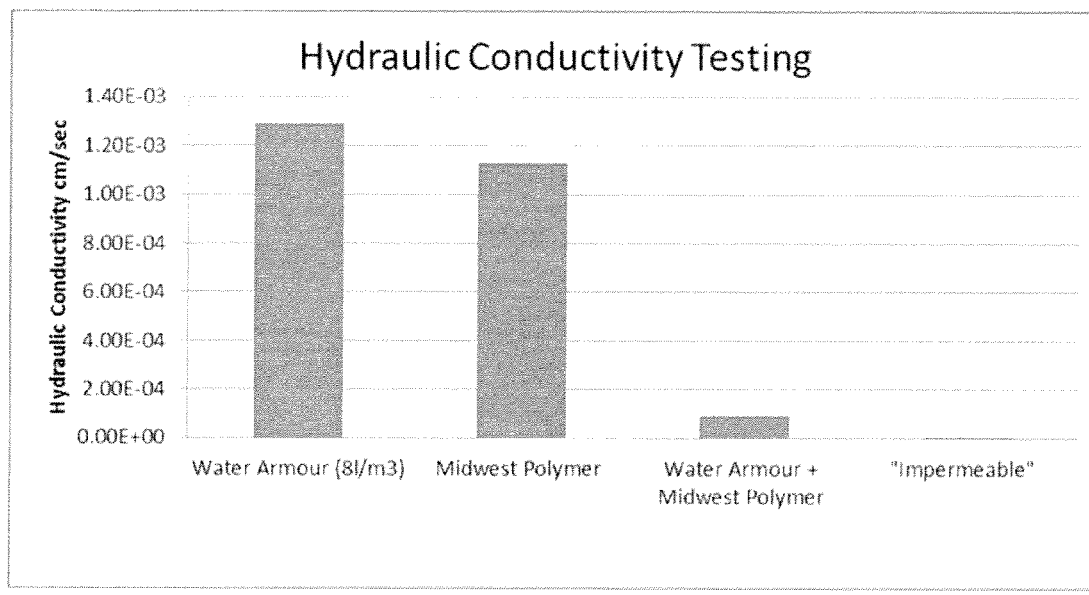
FIG. 7 shows a graph showing hydraulic conductivity.

With reference now to FIG. 7, the hydraulic conductivity of the mixture of the aqueous emulsion and the water repellant has a significantly decreased hydraulic conductivity, leading to a greater resistance to water than either the water repellant or the aqueous emulsion alone. The degree to which the water resistance was increased by the combination was a surprising result. The combination of the emulsion and water repellant fills in additional voids left by either the water repellant or aqueous emulsion alone.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the present embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

I claim:

1. A composition for chemical improvement of soil and road base materials, the composition comprising:
    an aqueous solution of a water repellant; and,
    an aqueous emulsion of a soil stabilizer and dust retardant, wherein the aqueous solution and aqueous emulsion have polymer components, wherein the polymer components have a molecular weight range of about $10^3$ g/mol to about $10^{10}$ g/mol.

2. The composition of claim 1, wherein the water repellant comprises about 0.25% to about 5.0% by weight of potassium hydroxide, about 10.0% to about 30.0% by weight of a methylsiliconate chosen from the group comprising potassium methylsiliconate and sodium methylsiliconate, and about 65.0% to about 89.0% by weight of water.

3. The composition of claim 2, wherein the aqueous emulsion of a soil stabilizer and dust retardant comprises:
    about 5.0% to about 60.0% by weight of polyacrylic acid and polyvinyl acetate; and,
    about 40.0% to about 95.0% by weight of water.

4. The composition of claim 3 wherein the composition further comprises an emulsifier.

5. The composition of claim 4, wherein the polyacrylic acid and polyvinyl acetate comprises a mixture of homopolymers.

6. The composition of claim 4, wherein the polyacrylic acid and polyvinyl acetate comprise a blend of copolymers.

7. The composition of claim 4, wherein the blend of polyacrylic acid and polyvinyl acetate copolymers includes styrene butadiene rubber.

8. The composition of claim 4, wherein the aqueous emulsion comprises:
    about 3.75% to about 45.0% by weight of polyacrylic acid and polyvinyl acetate polymer; and the water repellant comprises:
    about 0.25% to about 1.25% by weight of potassium hydroxide;
    about 2.5% to about 7.5% by weight of potassium methylsiliconate; and
    about 46.25% to about 93.5% by weight of water.

9. The composition of claim 4, wherein the aqueous emulsion comprises:
    about 1.25% to about 15.0% by weight of polyacrylic acid and polyvinyl acetate polymer; and the water repellant comprises:
    about 0.75% to about 3.75% by weight of potassium hydroxide;
    about 7.5% to about 22.5% by weight of potassium methylsiliconate; and
    about 58.75% to about 90.5% by weight of water.

10. A method for soil stabilization, the method comprising the steps of:
    (A) providing a composition comprising a heterogeneous mixture of an aqueous solution of a water repellant and an aqueous polymer emulsion of a soil stabilizer and dust retardant wherein the polymer components have a molecular weight range of about $10^3$ g/mol to about $10^{10}$ g/mol;

(B) scarifying associated soil or road base materials;

(C) applying the composition to soil or road base materials; and, (D) allowing the composition to penetrate the soil or road base materials, wherein particle weighting and adsorption promote adherence of molecules to the surface of soil or road base particles.

11. The method of claim 10, wherein the water repellant reacts with associate minerals in the soil or road base materials to form a hydrophobic silicone resin network.

12. The method of claim 11, wherein the hydrophobic silicone resin network does not close pores in the soil or road base materials.

13. The method of claim 10, wherein the aqueous emulsion comprises water, polyacrylic acid, and polyvinyl acetate.

14. The method of claim 13, wherein the polymers of the emulsion coalesce to form a bond with the soil or road base materials upon evaporation of water.

15. The method of claim 10, wherein the water repellant comprises potassium hydroxide, a methylsiliconate chosen from the group comprising potassium methylsiliconate and sodium methylsiliconate, and water.

16. The method of claim 15, wherein the methylsiliconate uses cohesion of the soil particles to form discrete hydrophobic silicone networks.

17. The method of claim 10, wherein the soil or road base material is scarified to a depth of about 4 to about 6 inches by road construction graders.

18. The method of claim 10, wherein the application of the composition increases the California Bearing Ratio and R-value of the soil or road base materials.

19. The method of claim 15, wherein the composition is applied in an amount chosen from the group comprising about 1 $L/m^3$ to about 10 $L/m^3$, about 10 $L/m^3$ to about 20 $L/m^3$, about 20 $L/m^3$ to about 30 $L/m^3$, about 30 $L/m^3$ to about 40 $L/m^3$, about 40 $L/m^3$ to about 50 $L/m^3$, about 50 $L/m^3$ to about 60 $L/m^3$, about 60 $L/m^3$ to about 70 $L/m^3$, about 70 $L/m^3$ to about 80 $L/m^3$, about 80 $L/m^3$ to about 90 $L/m^3$, and about 90 $L/m^3$ to about 100 $L/m^3$.

20. The method of claim 10, wherein the composition is applied in an amount greater than about 100 $L/m^3$.

* * * * *